J. E. FEATHERSTON.
AUTOMOBILE TUBE AND TIRE SIGNAL.
APPLICATION FILED SEPT. 27, 1912.
1,058,571.
Patented Apr. 8, 1913.
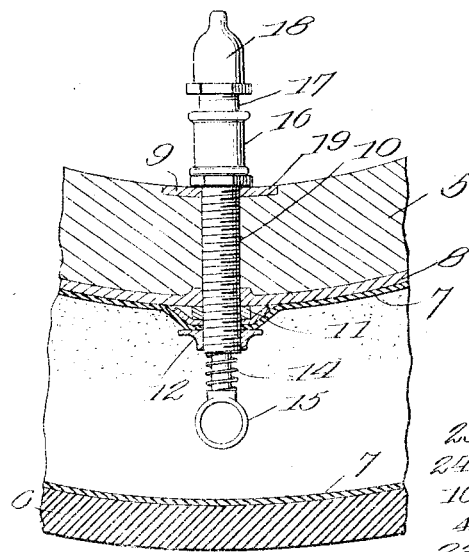
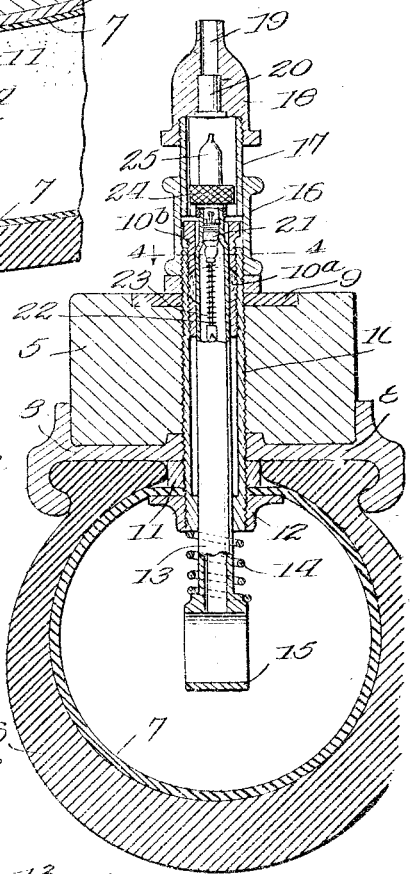
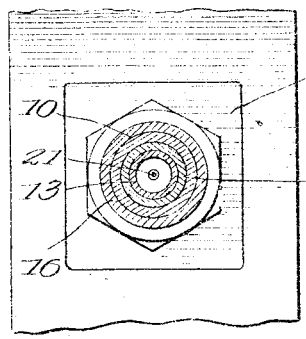
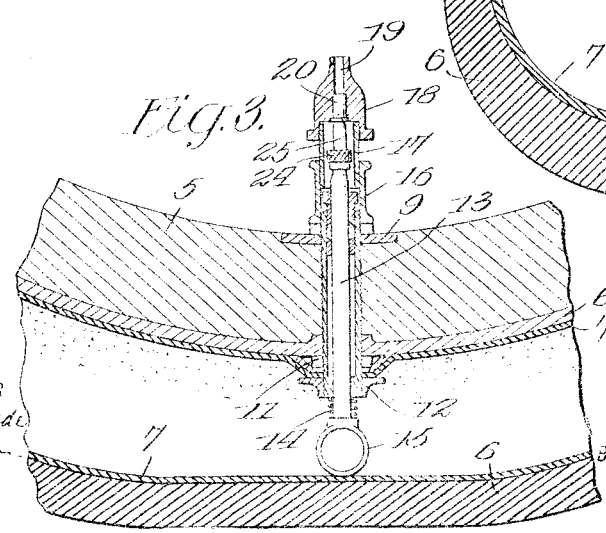
WITNESSES
Samuel E. Wade
Walton Harrison
INVENTOR
JOHN E. FEATHERSTON
BY Munn & Co.
ATTORNEYS

UNITED STATES PATENT OFFICE.

JOHN EMERSON FEATHERSTON, OF VALLEY CITY, NORTH DAKOTA.

AUTOMOBILE TUBE AND TIRE SIGNAL.

1,058,571.  Specification of Letters Patent.  Patented Apr. 8, 1913.

Application filed September 27, 1912. Serial No. 722,662.

*To all whom it may concern:*

Be it known that I, JOHN E. FEATHERSTON, a citizen of the United States, and a resident of Valley City, in the county of Barnes and State of North Dakota, have invented a new and useful Improvement in Automobile Tube and Tire Signals, of which the following is a specification.

My invention relates to automobile tube and tire signals, my more particular purpose being to provide a combination of a tube for inflating automobile tires, and a valve for retaining the air after the latter has been pumped into the tire, together with means for producing a signal whenever the tire is deflated while in use.

My invention comprehends more especially an automobile wheel rim carrying a tire and having a tube extending radially through the rim, and a plunger fitted air-tight within said tube and carrying a valve for retaining air in the tire, the plunger being movable relatively to the rim, under the rolling action of the wheel when the tire is deflated and controllable by deflation of the tire for the purpose of actuating the signal.

Reference is made to the accompanying drawing forming a part of this specification, and in which like letters indicate like parts.

Figure 1 is a fragmentary section through a portion of a wheel rim provided with my invention and taken in the direction of the general plane of the wheel, the parts being in normal position; Fig. 2 is a cross section through the mechanism shown in Fig. 1; Fig. 3 is a fragmentary section showing the parts in abnormal position, that is, the tire now being deflated, so as to actuate the signal; Fig. 4 is a section on the line 4—4 of Fig. 2 looking in the direction of the arrow.

The wheel rim is shown at 5, and at 6 is a tire which is provided with an inner tube 7 adapted to be inflated. The tire 6 is held upon the rim 5 by aid of a flange 8 for the purpose. A plate 9 is sunken into the rim 5, and extending radially inward through the plate 9 and rim 5 is a tube 10. This tube is engaged by a nut 11 which indents the inner tube 7. Another nut 12 is located within the inner tube, and a small portion of the inner tube is clamped between the nut 12 and the nut 11. A plunger 13 having a general tubular form extends axially through the tube 10 and is concentric to the same. Encircling the plunger 13 is a spiral spring 14, the lower end of which bears against a shoe 15 of substantially annular form. Fitting the upper end of the tube 10 is a sleeve 16, and carried by this sleeve is a smaller sleeve 17. Fitted upon the sleeve 17 is a signaling device which in this instance is a simple form of cartridge holder 18. The cartridge holder is provided with a bore 19, the lower portion of which is enlarged and serves as a cartridge chamber for receiving a cartridge 20. The plunger 13 at its inner or upper end is provided with a valve 21 for retaining air under pressure within the inner tube 7. The plunger 13 is rendered air-tight relatively to the tube 10 by a packing $10^a$, this packing being held in place by aid of an annular stuffing box $10^b$. The valve 21 is provided with a valve stem 22, and encircling this stem is a spring 23 for normally holding the valve closed.

Fitted upon the upper end of the plunger 13 is a cap 24 provided with a milled surface and carrying a firing pin 25.

The operation of my device is as follows:—The parts being constructed and arranged as above described, the sleeve 16 and parts carried by it may be removed from the tube 10 after which the cap 24 is removed and the tire may be inflated by pumping air through the tubular plunger 13 into the inner tube 7. The air thus pumped in is held by the valve 21. The tube 16 and parts carried by it may now be replaced. A new cartridge 20 is placed in position if the cartridge previously employed has been fired. The wheel is now ready for use. As it rolls along, the plunger 13 is not disturbed in its position relatively to the rim 5, because the shoe 15 does not come sufficiently near the ground, as will be understood from Fig. 1. If, however, the tire becomes partially deflated, the rotation of the wheel will cause the plunger to virtually strike the ground—that is, the shoe 15 will assume the position indicated in Fig. 3, and in consequence of the tire pressing flat upon the ground, the plunger will be moved upwardly, thus causing the firing pin 25 to strike the cartridge 20 and fire the same. The operator is thus apprised of the deflation of the tire. He thereupon dismounts from the machine and pumps air into the tire as above described, after which he places a new cartridge in the cartridge holder.

While I show the alarm mechanism as a cartridge firing device, it will be understood that any other form of alarm mechanism controllable by movements of the plunger 13, may be employed instead.

It will also be understood that the particular apparatus shown and described is merely one form of my invention, and that variations may be made in the construction employed without departing from the spirit of my invention.

Having thus described my invention, what I claim as new and desire to secure by Letters Patent is as follows:—

1. A device of the character described, comprising a pneumatic tire, a plunger connected with said pneumatic tire and having a substantially tubular form for the purpose of enabling air to be forced under pressure into said tire, means carried by said plunger for preventing retrogression of air therethrough, and alarm mechanism, controllable by movements of said plunger when said tire is deflated, for the purpose of indicating the deflation.

2. A device of the character described, comprising a pneumatic tire, a wheel rim for carrying said tire, a tube extending radially through said wheel rim and communicating with the interior of said tire, a plunger movable relatively to said tube and extending through the same, means for rendering said plunger air-tight relatively to said tube, a valve carried by said plunger for preventing retrogression of air when said air is forced under pressure through said plunger into said tire, and signaling mechanism controllable by movements of said plunger when said tire is deflated for indicating the deflation.

3. A device of the character described, comprising a wheel rim, a tire-member carried thereby and normally inflated, a tubular plunger carried by said wheel rim and communicating with said tire member for the purpose of inflating the same, said tubular member being movable relatively to said wheel rim when said tire is deflated and said plunger is brought near the ground during the rotation of the wheel, a valve mounted upon said tubular plunger for preventing retrogression of air therethrough from said tire, a firing pin carried by said tubular plunger, and means for holding a cartridge adjacent to said firing pin.

4. A device of the character described, comprising a wheel rim, a tire member carried thereby and normally inflated, a tubular plunger carried by said wheel rim and communicating with said tire for the purpose of inflating the same, a valve carried by said plunger for the purpose of preventing retrogression of air from said tire member, said plunger being movable relatively to said wheel rim when said tire member is deflated and is rolling upon the ground, and means controllable by movements of said plunger for actuating an alarm.

JOHN EMERSON FEATHERSTON.

Witnesses:
R. W. BASSETT,
HERMAN WINTERER.